US011420627B2

(12) United States Patent
Otake

(10) Patent No.: US 11,420,627 B2
(45) Date of Patent: Aug. 23, 2022

(54) DRIVING ASSISTANCE DEVICE

(71) Applicant: Toyota Jidosha Kabushiki Kaisha, Toyota (JP)

(72) Inventor: Hirotada Otake, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 16/937,730

(22) Filed: Jul. 24, 2020

(65) Prior Publication Data

US 2021/0139034 A1 May 13, 2021

(30) Foreign Application Priority Data

Nov. 7, 2019 (JP) .............................. JP2019-202288

(51) Int. Cl.
*B60W 30/18* (2012.01)
*B60W 40/105* (2012.01)

(52) U.S. Cl.
CPC .... *B60W 30/18009* (2013.01); *B60W 40/105* (2013.01); *B60W 2520/00* (2013.01); *B60W 2540/10* (2013.01); *B60W 2554/80* (2020.02)

(58) Field of Classification Search
CPC ......... B60W 30/143; B60W 30/18009; B60W 2554/80; B60W 2554/802; B60W 2552/53; B60W 2720/106; B60W 2520/00; B60W 2520/10; B60W 2720/10; B60W 2540/10; B60W 50/0097; B60W 2555/60; B60W 40/105
USPC .......................................................... 701/70
See application file for complete search history.

(56) References Cited

U.S. PATENT DOCUMENTS

| 2010/0006363 A1 | 1/2010 | Zagorski | |
| 2013/0110316 A1* | 5/2013 | Ogawa | G08G 1/096725 701/1 |
| 2013/0211688 A1* | 8/2013 | Oguri | G06F 17/00 701/70 |

(Continued)

FOREIGN PATENT DOCUMENTS

| EP | 2911134 A1 * | 8/2015 | ............ B60W 10/04 |
| JP | 2005-063398 A | 3/2005 | |

(Continued)

OTHER PUBLICATIONS

U.S. Appl. No. 17/224,241, filed Apr. 7, 2021 Inventors: Takahiro Kuno et al.

(Continued)

*Primary Examiner* — Atul Trivedi
(74) *Attorney, Agent, or Firm* — Dinsmore & Shohl LLP

(57) ABSTRACT

A driving assistance device is configured to perform deceleration control in such a way that a vehicle stops at a target position determined by a deceleration target ahead of the vehicle. The driving assistance device is configured to calculate a predicted vehicle speed of the vehicle at the target position when the deceleration control is performed, based on the current vehicle speed of the vehicle, the distance to the target position, and the deceleration that varies depending on the type of the deceleration target. When the predicted vehicle speed is higher than a predetermined value, the driving assistance device is configured not to perform the deceleration control or to reduce the deceleration in the deceleration control.

3 Claims, 3 Drawing Sheets

(56) References Cited

U.S. PATENT DOCUMENTS

| | | | |
|---|---|---|---|
| 2014/0058579 A1* | 2/2014 | Ono | G06F 17/00 |
| | | | 701/1 |
| 2014/0142797 A1* | 5/2014 | Otake | B60W 20/14 |
| | | | 701/1 |
| 2014/0285331 A1* | 9/2014 | Otake | G08G 1/096741 |
| | | | 340/435 |
| 2014/0309903 A1* | 10/2014 | Otake | G08G 1/166 |
| | | | 701/70 |
| 2014/0335994 A1* | 11/2014 | Otake | B60W 30/181 |
| | | | 477/3 |
| 2015/0274162 A1 | 10/2015 | Sato | |
| 2018/0120859 A1* | 5/2018 | Eagelberg | B60W 30/18163 |
| 2018/0178788 A1* | 6/2018 | Ikedo | B60W 50/14 |
| 2018/0292834 A1* | 10/2018 | Kindo | B60W 30/00 |
| 2018/0370529 A1* | 12/2018 | Matsunaga | B60W 50/14 |
| 2019/0001937 A1 | 1/2019 | Ito et al. | |
| 2019/0071076 A1* | 3/2019 | Nakatsuka | B60W 30/0953 |
| 2019/0155303 A1* | 5/2019 | Kawabe | G06N 5/02 |
| 2019/0283739 A1* | 9/2019 | Kim | B60W 30/0956 |
| 2019/0299995 A1 | 10/2019 | Tochigi et al. | |
| 2020/0226927 A1* | 7/2020 | Iwasaki | G08G 1/167 |
| 2020/0307573 A1* | 10/2020 | Kato | B60W 60/0027 |
| 2020/0307596 A1* | 10/2020 | Yashiro | B60W 30/12 |
| 2021/0370924 A1* | 12/2021 | Kuno | B60W 40/105 |

FOREIGN PATENT DOCUMENTS

| | | | | |
|---|---|---|---|---|
| JP | 2007-076472 A | | 3/2007 | |
| JP | 2013-218429 A | | 10/2013 | |
| JP | 2017-114427 A | | 6/2017 | |
| WO | 2014/076759 A1 | | 5/2014 | |
| WO | WO-2020053614 A1 | * | 3/2020 | ........ B60W 50/0205 |

OTHER PUBLICATIONS

U.S. Appl. No. 16/367,770, filed Mar. 28, 2019 Inventors: Kohei Tochigi et al.

Notice of Allowance issued to U.S. Appl. No. 16/367,770 dated Dec. 11, 2020.

* cited by examiner

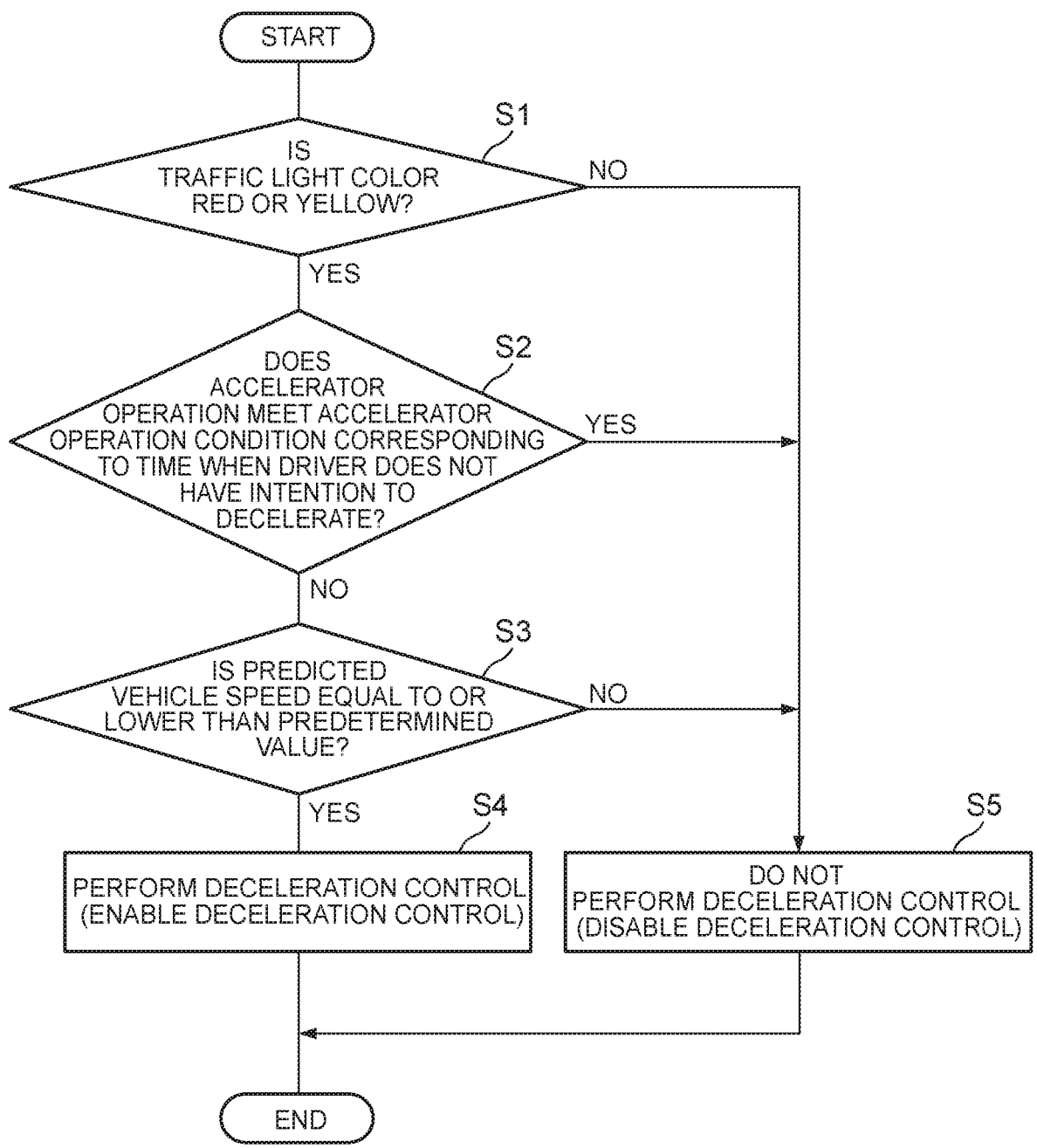

DRIVING ASSISTANCE DEVICE

CROSS-REFERENCE TO RELATED APPLICATIONS

This application claims priority to Japanese Patent Application No. 2019-202288 filed on Nov. 7, 2019, which is hereby incorporated by reference in its entirety including the specification, drawings and abstract is incorporated herein by reference in its entirety.

BACKGROUND

1. Technical Field

The present disclosure relates to a driving assistance device.

2. Description of Related Art

Conventionally, Japanese Unexamined Patent Application Publication No. 2013-218429 (JP 2013-218429 A) is known as a technical document relating to a driving assistance device. This publication discloses a technique that does not perform deceleration control (assistance) when the current vehicle speed of a vehicle is higher than a predetermined vehicle speed that varies depending upon the distance to the stop line (target position) of a traffic light (deceleration target) ahead of the vehicle.

SUMMARY

According to the driving assistance device such as the one described above, there is a possibility that, even when the vehicle speed at a target position where the deceleration control is performed is sufficiently high and it is apparently estimated that the driver does not have an intention to decelerate, the deceleration control is performed as in the other cases, for example, in a case when the driver has an intention to decelerate.

According to one aspect, the present disclosure provides a driving assistance device that can reduce the possibility that, when there is a possibility that the driver does not have an intention to decelerate, the deceleration control is performed as in the other cases.

One aspect of the present disclosure relates to a driving assistance device configured to perform deceleration control in such a way that a vehicle stops at a target position determined by a deceleration target ahead of the vehicle. The driving assistance device is configured to calculate a predicted vehicle speed of the vehicle at the target position when the deceleration control is performed, based on a current vehicle speed of the vehicle, a distance to the target position, and deceleration that varies depending on a type of the deceleration target. When the predicted vehicle speed is higher than a predetermined value, the driving assistance device is configured not to perform the deceleration control or to reduce the deceleration in the deceleration control.

The driving assistance device is configured to calculate the predicted vehicle speed of the vehicle at the target position when the deceleration control is performed, based on the current vehicle speed, the distance to the target position, and the deceleration that varies depending upon the type of the deceleration target. When the predicted vehicle speed is higher than the predetermined value, it can be estimated that the driver does not have an intention to decelerate. Therefore, the driving assistance device is configured not to perform the deceleration control or to reduce the deceleration in the deceleration control. In this way, the driving assistance device can reduce the possibility that, when there is a possibility that the driver does not have an intention to decelerate, the deceleration control is performed as in the other cases.

In the driving assistance device according to one aspect of the present disclosure, the predetermined value may be determined according to the type of the deceleration target and a detection likelihood of the deceleration target. This driving assistance device makes it possible to accurately estimate that there is a possibility that the driver does not have an intention to decelerate.

The driving assistance device according to one aspect of the present disclosure may be configured not to perform the deceleration control or to reduce the deceleration in the deceleration control when an accelerator operation for increasing an accelerator operation amount of the vehicle was detected, when an accelerator operation of the vehicle was not detected, or when an accelerator operation for reducing the accelerator operation amount of the vehicle was not detected. When the accelerator operation for increasing the accelerator operation amount of the vehicle was detected, when the accelerator operation of the vehicle was not detected, or when the accelerator operation for reducing the accelerator operation amount of the vehicle was not detected, it is found that there is a possibility that the driver does not have an intention to decelerate. Therefore, in these cases, the driving assistance device does not perform the deceleration control or the driving assistance device reduces the deceleration in the deceleration control, thus making it possible to further reduce the possibility that, when there is a possibility that the driver does not have an intention to decelerate, the deceleration control is performed as in the other cases.

According to one aspect of the present disclosure, it is possible to provide a driving assistance device that can reduce the possibility that, when there is a possibility that the driver does not have an intention to decelerate, the deceleration control is performed as in the other cases.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing an example of the processing of the driving assistance device shown in FIG. 1.

DETAILED DESCRIPTION OF EMBODIMENTS

Figure 1:
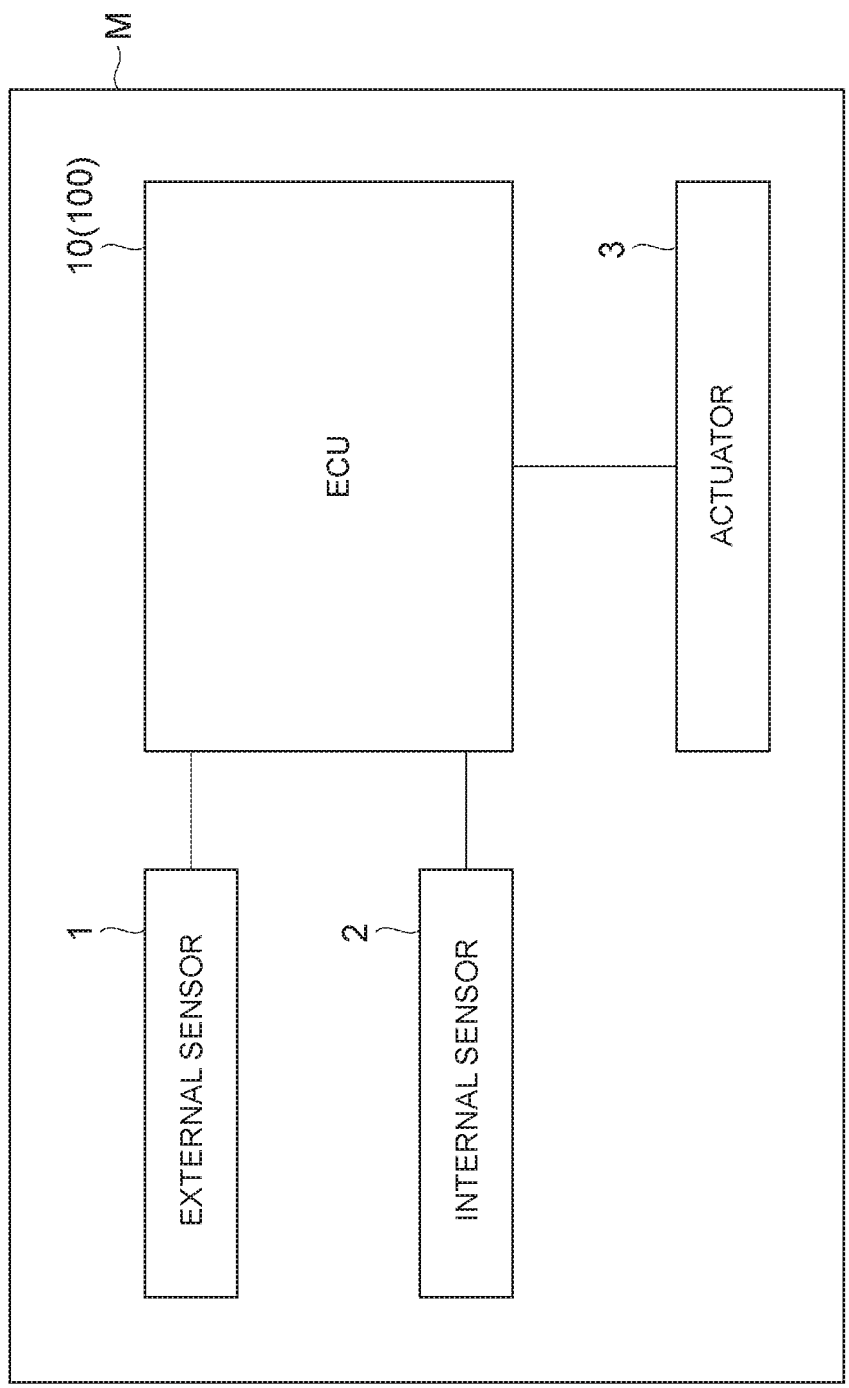
FIG. 1 is a block diagram showing a configuration of a vehicle on which a driving assistance device according to an embodiment is mounted.

An exemplary embodiment will be described below with reference to the drawings. In the description below, the same reference numerals will be given to the same or similar components and a duplicated description will not be repeated.

FIG. 1 is a block diagram showing a configuration of a vehicle M on which a driving assistance device 100 in the embodiment is mounted. As shown in FIG. 1, the driving assistance device 100 is a device that is mounted on a vehicle M, such as a passenger car, for assisting in driving of the vehicle M. When the vehicle M is an autonomous driving vehicle, the driving assistance device 100 may be a device capable of allowing the vehicle M to drive autonomously or may be a device only capable of assisting the driver of the vehicle M in driving.

The driving assistance device 100 includes an electronic control unit (ECU) 10 that integrally manages the system. The ECU 10 is an electronic control unit including a central processing unit (CPU), a read only memory (ROM), a random access memory (RAM), and the like. The ECU 10 loads a program from the ROM into the RAM and causes the CPU to execute the program, loaded into the RAM, for implementing various functions. Some of the functions of the ECU 10 may be performed in a server that can communicate with the vehicle M. The ECU 10 may be configured by a plurality of electronic units. The ECU 10 is connected to an external sensor 1, an internal sensor 2, and an actuator 3.

The external sensor 1 is a detector that detects the situation around the vehicle. The external sensor 1 includes at least one of a camera and a radar sensor. The camera is a capturing apparatus for capturing the external situation of the vehicle. The camera is provided, for example, on the reverse side of the windshield of the vehicle to capture an image in front of the vehicle. The camera sends the captured information on the external situation of the vehicle to the ECU 10. The camera may be a monocular camera or a stereo camera. A radar sensor is a detector that detects objects around the vehicle using radio waves (for example, millimeter waves) or light. The radar sensor includes, for example, a millimeter-wave radar or a Light Detection and Ranging (LIDAR). The radar sensor sends electric waves or light to the surroundings of the vehicle and detects an object by receiving electric waves or light reflected by the object. The radar sensor sends the information on the detected object to the ECU 10. The objects detected in this way include fixed obstacles such as guardrails and buildings, as well as moving obstacles such as pedestrians, bicycles, and other vehicles.

The internal sensor 2 is a detector that detects the traveling state of the vehicle. The internal sensor 2 includes a vehicle speed sensor or an acceleration sensor. The internal sensor 2 may include a yaw rate sensor. The vehicle speed sensor is a detector that detects the speed of the vehicle. For example, as the vehicle speed sensor, a wheel speed sensor is used that is provided on the wheels of the vehicle or on the drive shaft that rotates in synchronization with the wheels for detecting the rotation speed of the wheels. The vehicle speed sensor sends the detected vehicle speed information (wheel speed information) to the ECU 10.

The acceleration sensor is a detector that detects the acceleration of the vehicle. The acceleration sensor includes, for example, a longitudinal acceleration sensor that detects the longitudinal acceleration of the vehicle and a lateral acceleration sensor that detects the lateral acceleration of the vehicle. The acceleration sensor sends the detected acceleration information on the vehicle to the ECU 10. The yaw rate sensor is a detector that detects the yaw rate (rotation angle speed) around the vertical axis of the center of gravity of the vehicle. For example, a gyro sensor may be used as the yaw rate sensor. The yaw rate sensor sends the detected yaw rate information on the vehicle to the ECU 10.

The actuator 3 is an apparatus used for controlling the vehicle. The actuator 3 includes at least a drive actuator, a brake actuator, and a steering actuator. The drive actuator controls the amount of air to be supplied to the engine (throttle valve opening degree) according to the control signal from the ECU 10 for controlling the driving force of the vehicle. When the vehicle is a hybrid vehicle, not only the amount of air to be supplied to the engine but also the control signal from the ECU 10 to the motor, which works as the power source, is input for controlling the driving force. When the vehicle is an electric vehicle, the control signal from the ECU 10 is input to the motor, which works as the power source, for controlling the driving force. The motor that works as the power source in these cases constitutes the actuator 3.

The brake actuator controls the brake system according to the control signal from the ECU 10 for controlling the braking force applied to the wheels of the vehicle. For example, a hydraulic brake system can be used as the brake system. The steering actuator controls the driving of the assist motor, which is included in the electric power steering system for controlling the steering torque, according to the control signal from the ECU 10. In this way, the steering actuator controls the steering torque of the vehicle.

The ECU 10 performs deceleration control in such a way that the vehicle is stopped at a target position determined by a deceleration target ahead of the vehicle M. The deceleration target is not limited to a particular object and may be any object. For example, the deceleration target includes another vehicle traveling ahead of the vehicle M (in the description below, also referred to as a "preceding vehicle"), a stop line, a traffic light, and the like. The type of a preceding vehicle is not limited to a particular type and may be any type. The stop line is a road marking that serves as an indication of the position at which the vehicle is to stop or pause. The traffic light is a device that indicates signals, such as a start permission and a stop instruction, to ensure traffic safety or smooth traffic flow. The traffic light includes a vehicle-traffic light opposed to and facing the vehicle M. The traffic light mentioned here does not include a traffic light the reverse side of which or the side of which faces the vehicle M. The form of the traffic light is not limited to a particular form and may be any form.

The deceleration control is a control operation for decelerating the vehicle M at a deceleration that varies depending upon the type of a deceleration target in order to stop the vehicle M at a target position. The type of a deceleration target can be recognized by a known method, for example, based on the detection result of the external sensor 1. The stopped state is a state in which the vehicle speed of the vehicle M is 0 km/h or the vehicle speed is lower than a stopped state threshold. The stopped state threshold is a threshold that is set in advance. The stopped state threshold may be, for example, 5 km/h or 3 km/h.

The target position determined by a deceleration target, which is a position determined by the type and the state of the deceleration target, is a target position at which the vehicle M is to stop. The target position determined by the deceleration target is a position near the deceleration target. The target position determined by the deceleration target can be determined by a known method, for example, based on at least one of the type of the recognized deceleration target and the detection result of the external sensor 1. For example, when the deceleration target is a preceding vehicle, the target position is a position immediately before the preceding vehicle. When the deceleration target is a stop line, the target position is the position immediately before the stop line. When the deceleration target is a traffic light, the target position is the position immediately before the traffic light.

In this embodiment, the deceleration that varies depending upon the type of a deceleration target is classified, for example, into the following three: a first deceleration that is a deceleration when the deceleration target is a preceding vehicle, a second deceleration that is a deceleration when the deceleration target is a stop line, and a third deceleration that is a deceleration when the deceleration target is a traffic light. In this case, there is the following relation: first deceleration>second deceleration>third deceleration. The reason for the relation "second deceleration>third deceleration" is that, when a traffic light and a stop line are compared, the determination level of the stop position is considered to be lower when the traffic light is detected than when the stop line is detected (the determination level of the stop position determined when the traffic light is detected may be overridden when the stop line is detected). The reason for the relation "first deceleration>second deceleration" is that the detection of a stop line is later than the detection of a preceding vehicle (because the stop line has no height and, in addition, there is a possibility that a stop line may be erroneously recognized due to rubbing etc.). In addition, the risk of not being able to stop immediately before a stop line is lower than the risk of not being able to stop immediately before a preceding vehicle. The deceleration that varies depending upon the type of a deceleration target may be a fixed value or a variable value. The deceleration that varies depending upon the type of a deceleration target can be obtained, for example, from a data table, arithmetic expression, deceleration calculation model, or the like determined in advance for each deceleration target based on the type of a recognized deceleration target.

For example, when a deceleration target is recognized based on the detection result of the external sensor 1, the ECU 10 performs deceleration control (outputs the control signal to the actuator 3). Note that the deceleration control is not limited to a particular control method and any other known deceleration control method may be used as long as the vehicle M is decelerated in such a way that the vehicle stops at a target position determined by a deceleration target ahead of the vehicle M.

Figure 2A:
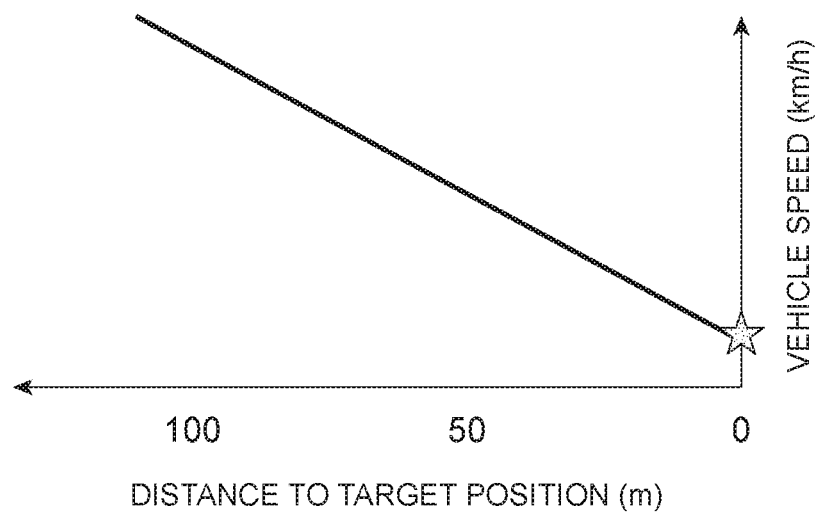
FIG. 2A is a graph showing an example of the calculation of a predicted vehicle speed of a vehicle at a target position.

Based on the current vehicle speed of the vehicle M, the distance to a target position, and the deceleration that varies depending upon the type of a deceleration target, the ECU 10 calculates the predicted vehicle speed of the vehicle M at the target position that is applicable when deceleration control is performed (In the description below, the predicted vehicle speed of the vehicle M calculated in this way is also simply referred to as "predicted vehicle speed"). The current vehicle speed of the vehicle M can be acquired, for example, based on the detection result of the internal sensor 2. The distance to the target position can be acquired, for example, based on the detection result of the external sensor 1. For example, when the deceleration control is performed, the vehicle speed of the vehicle M is decelerated at a constant deceleration as the distance to the target position becomes smaller, as shown in FIG. 2A. The vehicle speed at the point where the distance to the target position in the figure is 0 (indicated by the star mark in the figure) can be calculated as the predicted vehicle speed. In calculating the predicted vehicle speed, the road surface gradient of the road on which the vehicle M travels may be taken into consideration. The road surface gradient can be acquired, for example, using the detection result of the external sensor 1. The road surface gradient can be taken into consideration using, for example, a known method.

When the predicted vehicle speed is higher than a predetermined value, the ECU 10 does not perform the deceleration control or the ECU 10 reduces the deceleration in the deceleration control. That the deceleration control is not performed means that the deceleration control is stopped and the execution of the deceleration control is prohibited. That the deceleration is reduced means that the deceleration of the deceleration control is changed from the currently-set deceleration to a lower deceleration by a predetermined amount. The predetermined amount is not limited to a particular amount and may be a predetermined fixed amount or a variable amount. That the deceleration is reduced means that relaxing (weakening) the deceleration control. That the deceleration is reduced in the deceleration control means, in other words, that the reduced speed control, which is the deceleration control at a lower deceleration, is performed instead of the normal deceleration control.

Figure 2B:
FIG. 2B is a graph showing an example of the setting of a predetermined value.

The above-described predetermined value is a value determined according to the type of a deceleration target and the detection likelihood of the deceleration target. For example, the predetermined value can be set as follows. That is, the ECU 10 first calculates the detection likelihood of the deceleration target from the detection result of the external sensor 1 (for example, from the image captured by the camera). More specifically, when it is recognized that the deceleration target is a traffic light, the ECU 10 sets the detection likelihood to "high" when red or yellow can be recognized as a traffic light color and, in addition, when no arrow signal is lit. When it is recognized that the deceleration target is a traffic light, the ECU 10 sets the detection likelihood to "high" when red or yellow can be recognized as a traffic light color and, in addition, when it is determined from the direction of the arrow signal that the vehicle cannot go straight ahead. When it is recognized that the deceleration target is a traffic light, the ECU 10 sets the detection likelihood to "medium" when red or yellow can be recognized as a traffic light color and, in addition, when whether the arrow signal is lit is unknown. When it is recognized that the deceleration target is a traffic light, the ECU 10 sets the detection likelihood to "low" when red or yellow can be recognized as a traffic light color and, in addition, the arrow signal is recognized but the direction of the arrow signal is not determined. Then, as shown in FIG. 2B, the ECU 10 determines the predetermined value in such a way that the higher the detection likelihood is, the proportionally larger the predetermined value becomes. The predetermined value is no limited to a particular value and may be any value. The predetermined value may be a predetermined constant value or may be determined according to only the type of the deceleration target. A detection likelihood is also called a detection confidence.

For example, when it is recognized that the deceleration target is a traffic light but when red or yellow is not recognized as a traffic light color, the ECU 10 does not perform the deceleration control or the ECU 10 reduces deceleration in the deceleration control. The ECU 10 detects an accelerator operation of the vehicle M, for example, based on the detection result of the accelerator sensor or the like. The accelerator operations detected by the ECU 10 include whether or not an accelerator operation for increasing the accelerator operation amount of the vehicle M was performed (for example, whether or not an operation for depressing the accelerator pedal was performed), whether or not an accelerator operation of the vehicle M itself was performed (for example, whether or not the accelerator pedal is not operated), and whether or not an accelerator operation for reducing the accelerator operation amount of the vehicle M was performed (for example, whether or not an operation for releasing the accelerator pedal was performed). Then, when an accelerator operation for increasing the accelerator operation amount of the vehicle M was detected, when an accelerator operation of the vehicle M was not detected, or when an accelerator operation for reducing the accelerator operation amount of the vehicle M was not detected, the ECU 10 does not perform the deceleration control or the ECU 10 reduces deceleration in the deceleration control, assuming that the accelerator operation meets the accelerator operation condition corresponding to a time when the driver does not have an intention to decelerate (the accelerator operation condition that is satisfied when the driver has little or no intention to decelerate).

Next, an example of the processing of the ECU 10 in the driving assistance device 100 will be described with reference to the flowchart in FIG. 3. In the example given below, it is assumed that the deceleration target is a traffic light.

When a traffic light is recognized from the detection result of the external sensor 1 while the vehicle M is traveling with driving assistance enabled or the vehicle M is traveling autonomously, the ECU 10 checks the detection result to determine whether the traffic light color of the traffic light is red or yellow (step S1). When the result of step S1 described above is YES, the ECU 10 determines whether the accelerator operation of the vehicle M meets the accelerator operation condition corresponding to a time when the driver has no intention decelerate (step S2). When the result of step S2 is NO, the ECU 10 calculates the predicted vehicle speed and determines whether the calculated predicted vehicle speed is equal to or lower than a predetermined value (step S3). When the result of step S3 is YES, the ECU 10 permits the deceleration control with the above-described deceleration control enabled (step S4). On the other hand, when the result of step S1 is NO, when the result of step S2 is YES, or when the result of step S3 is NO, the ECU 10 assumes that the driver has little or no intention to decelerate (assumes that the driver has an intention to pass through the traffic light), disables the deceleration control, and does not perform the deceleration control (step S5). In step S5, instead of not performing the deceleration control, the ECU 10 may reduce deceleration in the deceleration control.

As described above, the driving assistance device 100 performs the deceleration control in such a way that the vehicle M stops at the target position determined by the deceleration target ahead of the vehicle M. In doing so, when the predicted vehicle speed of the vehicle M at the target position where the deceleration control is performed is higher than the predetermined value, it can be estimated that there is a possibility that the driver does not have an intention to decelerate. In this case, the driving assistance device 100 does not perform the deceleration control or the driving assistance device 100 decreases the deceleration in the deceleration control. In this way, the driving assistance device 100 can reduce the possibility that, when there is a possibility that the driver does not have an intention to decelerate, the deceleration control is performed as in the other cases.

In the driving assistance device 100, the predetermined value is determined according to the type of a deceleration target and the detection likelihood of the deceleration target. This driving assistance device 100 makes it is possible to accurately estimate that there is a high possibility that the driver does not have an intention to decelerate.

When an accelerator operation for increasing the accelerator operation amount of the vehicle M was detected, when an accelerator operation of the vehicle M was not detected, or when an accelerator operation for reducing the accelerator operation amount of the vehicle M was not detected, the driving assistance device 100 does not perform the deceleration control or the driving assistance device 100 reduces the deceleration in the deceleration control. When the accelerator operation for increasing the accelerator operation amount of the vehicle M was detected, when the accelerator operation of the vehicle M was not detected, or when the accelerator operation for reducing the accelerator operation amount of the vehicle M was not detected, it is found that there is a possibility that the driver does not have an intention to decelerate. Therefore, in these cases, the driving assistance device 100 does not perform the deceleration control or the driving assistance device 100 reduces the deceleration in the deceleration control, thus making it possible to reduce the possibility that, when there is a possibility that the driver does not have an intention to decelerate, the deceleration control is performed as in the other cases.

While the embodiment of the present disclosure has been described, it is to be understood that an embodiment of the present disclosure is not limited to the embodiment above. An embodiment of the present disclosure may be implemented not only by the above-described embodiment but also in various modes in which various changes and modifications are added based on the knowledge of those skilled in the art.

In the embodiment described above, the map information stored in the map database may be used in the processing of the driving assistance device 100. In the embodiment described above, the information acquired by at least one of the vehicle-to-vehicle communication and the road-to-vehicle communication may be used in the processing of the driving assistance device 100. In the above-mentioned embodiment, the position information on the vehicle M acquired by Global Positioning System (GPS), Global Navigation Satellite System (GNSS), Simultaneous Localization and Mapping (SLAM), and the like may be used in the processing of the driving assistance device 100. In the above description, "decreasing deceleration" means "decreasing the absolute value of acceleration".

What is claimed is:

1. A driving assistance device configured to perform deceleration control in such a way that a vehicle stops at a target position determined by a deceleration target ahead of the vehicle, wherein:
   the driving assistance device is configured to calculate a predicted vehicle speed of the vehicle at the target position when the deceleration control is performed, based on a current vehicle speed of the vehicle, a distance to the target position, and deceleration that varies depending on a type of the deceleration target; and
   when the predicted vehicle speed is higher than a predetermined value, the driving assistance device is configured not to perform the deceleration control or to reduce the deceleration in the deceleration control.

2. The driving assistance device according to claim 1, wherein the predetermined value is determined according to the type of the deceleration target and a detection likelihood of the deceleration target.

3. The driving assistance device according to claim 1, wherein the driving assistance device is configured not to perform the deceleration control or to reduce the deceleration in the deceleration control when an accelerator operation for increasing an accelerator operation amount of the vehicle was detected, when an accelerator operation of the vehicle was not detected, or when an accelerator operation for reducing the accelerator operation amount of the vehicle was not detected.

\* \* \* \* \*